May 11, 1937.  R. CHILTON  2,079,682
TRANSMISSION CONTROL
Original Filed May 4, 1934   6 Sheets-Sheet 2

INVENTOR
ROLAND CHILTON
BY
ATTORNEY

May 11, 1937.    R. CHILTON    2,079,682
TRANSMISSION CONTROL
Original Filed May 4, 1934    6 Sheets-Sheet 3

INVENTOR
ROLAND CHILTON
BY
ATTORNEY

May 11, 1937.   R. CHILTON   2,079,682
TRANSMISSION CONTROL
Original Filed May 4, 1934   6 Sheets-Sheet 4

Fig. 4

INVENTOR
ROLAND CHILTON
BY
ATTORNEY

Patented May 11, 1937

2,079,682

UNITED STATES PATENT OFFICE 2,079,682

TRANSMISSION CONTROL

Roland Chilton, Ridgewood, N. J.

Original application May 4, 1934, Serial No. 723,889. Divided and this application December 31, 1935, Serial No. 56,901

5 Claims. (Cl. 74—336.5)

This invention comprises improvements in transmissions; especially automobile transmissions of the change speed type. It is a division of application Serial No. 723,889, filed May 4, 1934.

As pointed out in said original application, it is an object of the invention to provide an organization wherein the characteristics and advantages listed below are achieved:

(1) Complete and practically instantaneous disengagement of the mechanism from driving torque for shift;

(2) Practically instantaneous and positive re-establishment of the drive connection immediately upon completion of a gear shift;

(3) Mechanical interconnection of the clutching and gear shifting functions independently of coordination by the operator, or automatic control mechanism;

(4) The achievement of a minimum of flywheel or momentum effects at the members engaged by any shift;

(5) Provision of a clutch mechanism requiring a minimum of effort to effect complete disengagement and re-engagement from the power means for shifting;

(6) The provision of automatic means for limiting the maximum rate of acceleration of the driven shaft independently of any skill in clutch manipulation by the operator, and regardless of the suddenness with which the disconnecting clutch may be re-engaged and/or of any speed differences which may exist between the clutch members prior to such engagement;

(7) The provision of means whereby the operator may at will modify the maximum rate of acceleration produced by the automatic acceleration limiting means;

(8) To provide automatic means for effecting the interconnected clutching and shifting operations according to requirements, and, when desired, independently of the operator, except insofar as the action may automatically respond to the vehicle speed attained due to operation of the engine throttle control;

(9) To provide the driver with a setting control whereby he may, from time to time, vary the characteristics determining the vehicle speeds at which the automatic shift into the various gear ratios is effected;

(10) To provide a light control whereby the operator may, at any instant, initiate the automatic shift to higher and lower ratios; and (11) The provision of a simplified synchronizing means for bringing the parts concerned to unitary speed before gear changing engagement is effected.

The structure having to do with the clutch combination having been claimed in said original application, and the structure having to do with the inertia control device or coupling having been claimed in a further divisional application (Serial No. 56,900, filed concurrently herewith) it should here be pointed out that the subject matter herein claimed is concerned with the control of the transmission only. A description of the complete transmission, in its preferred embodiment, is believed, however, to be in order.

It will be realized that the skilled driver of a conventional automobile coordinates several functions when executing a quiet shift. In starting, he must so relate the rate at which he relaxes pressure on the clutch pedal with the rate at which he depresses the accelerator pedal as to avoid stalling the engine or producing an unpleasant rate of acceleration which characterizes the jerky start of an unskilled driver. In changing into a higher gear the driver of the conventional car must de-clutch just before he releases the accelerator pedal, the reverse operation, when in a low gear, giving an objectionably rapid deceleration in the interval before clutch disengagement. He must then wait until the gears to be engaged come to unitary speed (which is accelerated by synchronizing devices), complete the shift; use the accelerator pedal to bring the engine up to clutch speed so that he may engage the clutch without uncomfortable acceleration or deceleration, whereupon he may fully depress the throttle. In changing down, the driving clutch member must be accelerated to effect a quiet shift, either by synchronizing devices which require an appropriate dwell in the middle of the gear shift movement, or by "double-clutching" and speeding up the engine, which is beyond the skill of most drivers. The gear clashing resulting from failure to coordinate these operations is the cause for the demand for automatic shifts, and of the difficulty in providing a satisfactory mechanism—most of those in the prior art tending to be more or less brutal, since they fail to effect the coordination practiced by a skilled driver.

The transmission of the present invention may be operated either manually or automatically, but in either case the new clutch combination herein disclosed automatically precludes clashing of the gears or excessive car accelerations. The degree of noise accompanying a shift, or alternatively, the capacity and time required by the synchronizing devices which prevent such noise, depend mainly upon the flywheel effect of the driven clutch member; and freedom from clutch drag in the disengaged position is a further requirement for proper synchronization. At the same time the clutch must be "soft" in its action, while, for quick shifting, instantaneous release and engagement are desired. It also is necessary to have great slipping capacity in the clutch mechanism and these requirements are conflicting, wherefore they are not met in the conventional single clutch system. Accordingly, in the present invention two distinct forms of clutch are used, firstly (preferably between the engine and the transmission) a small diameter coil clutch characterized by the extremely low operation pressures required and by complete and virtually instantaneous engagement and disengagement, and by the very small inertia in its driven member, and secondly, a large diameter pre-loaded multiple plate clutch preferably between the main shaft and the driven shaft characterized by capacity for long and smooth slippage, and not requiring any disengaged position or freedom from drag. Incorporated in this latter clutch is an automatic inertia device which opposes to the clutch spring pressure a force proportional to the rate of acceleration of the driven member whereby the acceleration of the vehicle is limited despite the sudden engagement characteristic of the coil clutch.

In the drawings, wherein like reference characters denote like or corresponding parts:

Fig. 8 is a fragmentary end view of the shifter forks and cam;

Figure 1:
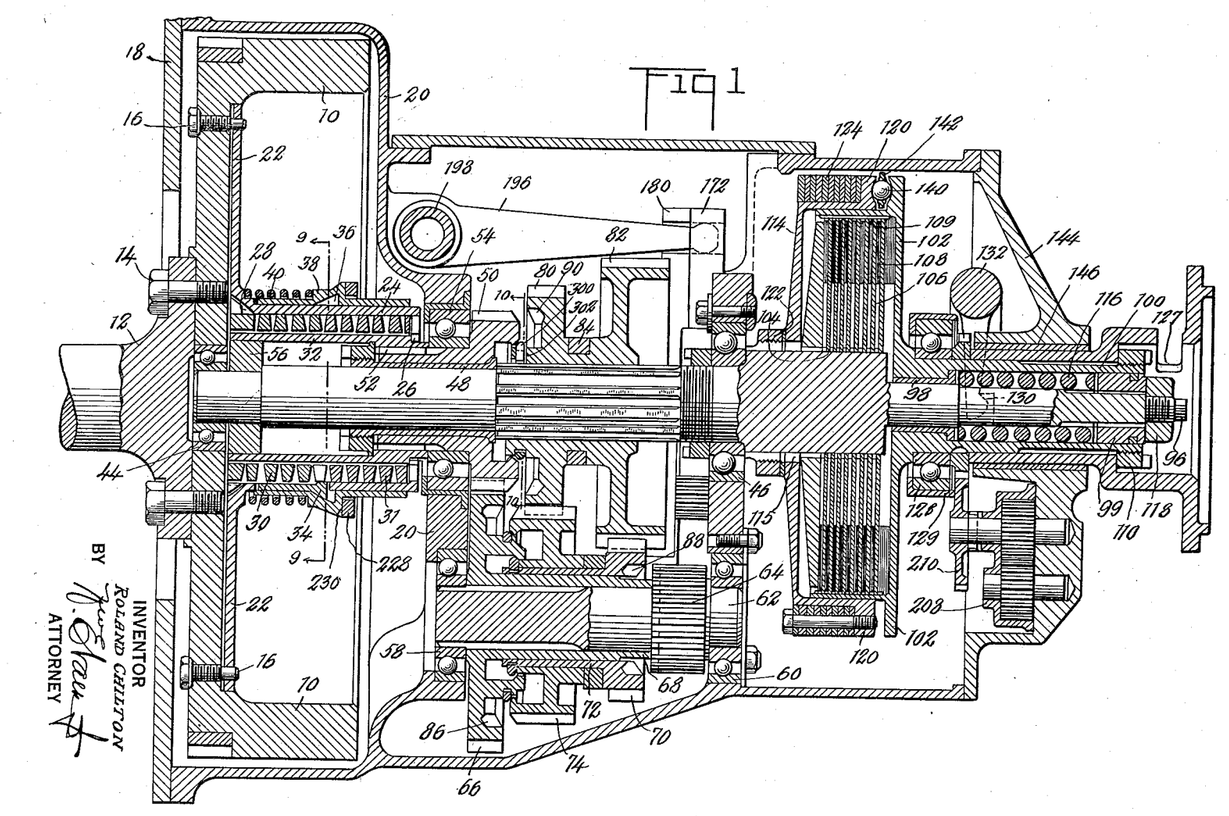
Fig. 1 is a longitudinal axial section on the line 1—1 of Fig. 3.

Referring first to Fig. 1, 10 designates a flywheel secured to a conventional automobile crankshaft 12 by bolts 14 and furnished with driving studs 16. The engine has the usual rear plate 18 to which is bolted the transmission housing 20.

Engaged with the driving studs 16 is the driving plate 22 of the outer clutch drum 24 which has splined projections 26 at its right hand end, and angular splines 28 at its left hand end. Clutch coils 30 and 31 have end splines engaging the driving drum splines 28, 26, and frictionally engageable within these coils is the driven drum 32 characterized by its lightness and small diameter. The inner ends of the coils 30—31 (i. e., the ends remote from their respective splined driving connections 26—28 with the drum 24) terminate in proximity to each other, as indicated in the detailed view of Fig. 9, and these free ends of the coils are bridged by a key 34 adapted to be forced radially inwards by a conical recess 36 in a control sleeve 38 under the action of a light clutch spring 40, but subject to the control of a fork 228 engaging a shoulder 230, as fully described hereinafter. By the use of two coils engaged with the driving drum at opposite ends, the free-wheeling action characteristic of a single coil is prevented, but where free-wheeling is desired, a single coil of the appropriate helix may be used.

Figure 9:
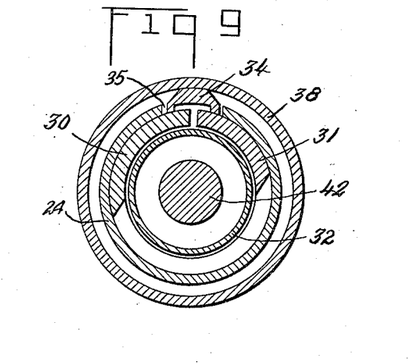
Fig. 9 is a fragmentary transverse section, taken on the line 9—9, Fig. 1, but rotated through 180° relatively to the position shown in said figure.

It will be seen that the key 34 is loosely engaged in an opening 35 in the drum 24, and that the key has two prongs bearing on the ends of the respective coils 30, 31 so that whenever the key is forced inwardly by coaction with the conical recess 36 of the outer or control sleeve 38, the ends of the coils are forced into contact with the inner or driven drum 32, thus initiating self-locking driving action according to the well known operation of a coil type clutch.

The main shaft of the transmission is shown at 42 and is carried by the pilot bearing 44 in the flywheel 10 and by the rear bearing 46 in the housing 20. Mounted for free rotation with the bushing 48 on the main shaft 42 is the stem gear 50 which is splined at 52 into the driven clutch drum 32 and supported on the bearing 54 in the housing 20. The clutch drum 32 is additionally centralized upon the main shaft 42 by the thick bushing 56.

Mounted in bearings 58, 60, in the housing 20 is the lay-shaft 62 having the integral reverse gear 64 and carrying the spline-mounted constant mesh gear 66 through its sleeve 68. Rotatable upon this sleeve is the first speed lay-shaft gear 70 having the sleeve 72, and again rotatably mounted upon this sleeve is the second speed lay-shaft gear 74. The gears 74 and 70 are together slidable upon the gear sleeve 68 by the shifter fork 76. The main shaft 42 is splined at 78 for mounting the second and first main shaft gears 80, 82, slidable through the shift fork 84. The gears 66, 70 and 80 are provided with internal teeth 86, 88 and 90 engageable respectively with the ends of the teeth of the gears 74, 64, and 50, these engagements comprising dog clutches. A reverse idler gear 92 on the spindle 94 (Fig. 3) is in permanent mesh with the pinion 64 and engageable with the gear 82 when this is moved to the right of Fig. 1.

The main shaft 42 is provided at its right hand end with an extension 96 upon which is rotatably mounted, on bushings 98, 99, the hollow driven shaft 100 having the clutch drum 102. The main shaft is further provided with an enlarged splined portion 104 with which are engaged the inner clutch plates 106 between which are frictionally engaged the outer clutch plates 108, splined at 109 into the clutch drum 102. A pressure plate 114 engages a shoulder 115 forming an abutment for the clutch plate assembly under the pressure of the clutch spring 116 adjustable by the nut 118 upon the extension 96 of the main shaft. Mounted for limited rotational freedom around the clutch is the inertia member 120 axially adjustable by the thrust nut 122, and furnished with the inertia weights 124; the number used comprising an adjustment of the clutch acceleration characteristics.

The driven shaft 100 carries the flanged sleeve 126 for attachment of the usual propeller shaft universal joint. The flanged sleeve 126 is provided with an opening 127 for adjustment of the clutch spring nut 118, and the nut 110 clamps the sleeve 126 and the oil pump gear 212 and the inner race of the thrust bearing 128, the outer race of which has a draw collar 129 engaging the levers 130 on the control shaft 132, which carries the clutch pedal 134.

Figure 6:
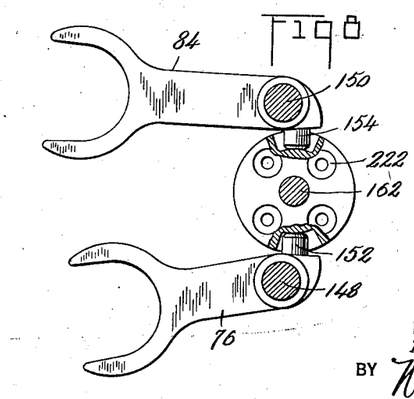
Fig. 6 is a development of the control cam.
Figures 6, 7:
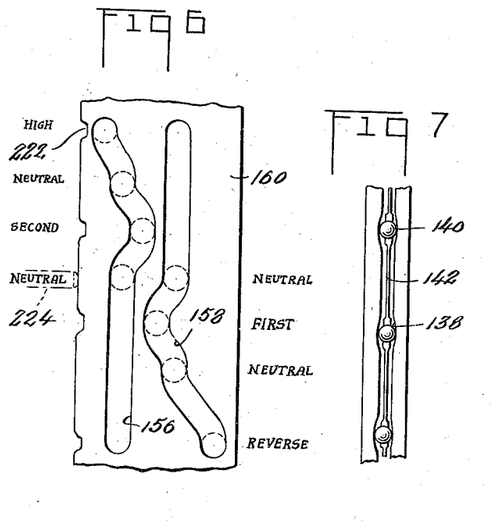
Fig. 7 is a development of the ball tracks of the automatic acceleration limiting device.

The unloading or acceleration limiting device includes sloping tracks 138, Fig. 7, formed respectively in the inertia member 120 and the clutch drum 102 and separated by the balls 140 retained by the cage 142. It will be noted that the rear cover 144 is provided with a bushing 146 for the support of the drive shaft 100 with the flanged sleeve 126.

Figure 2:
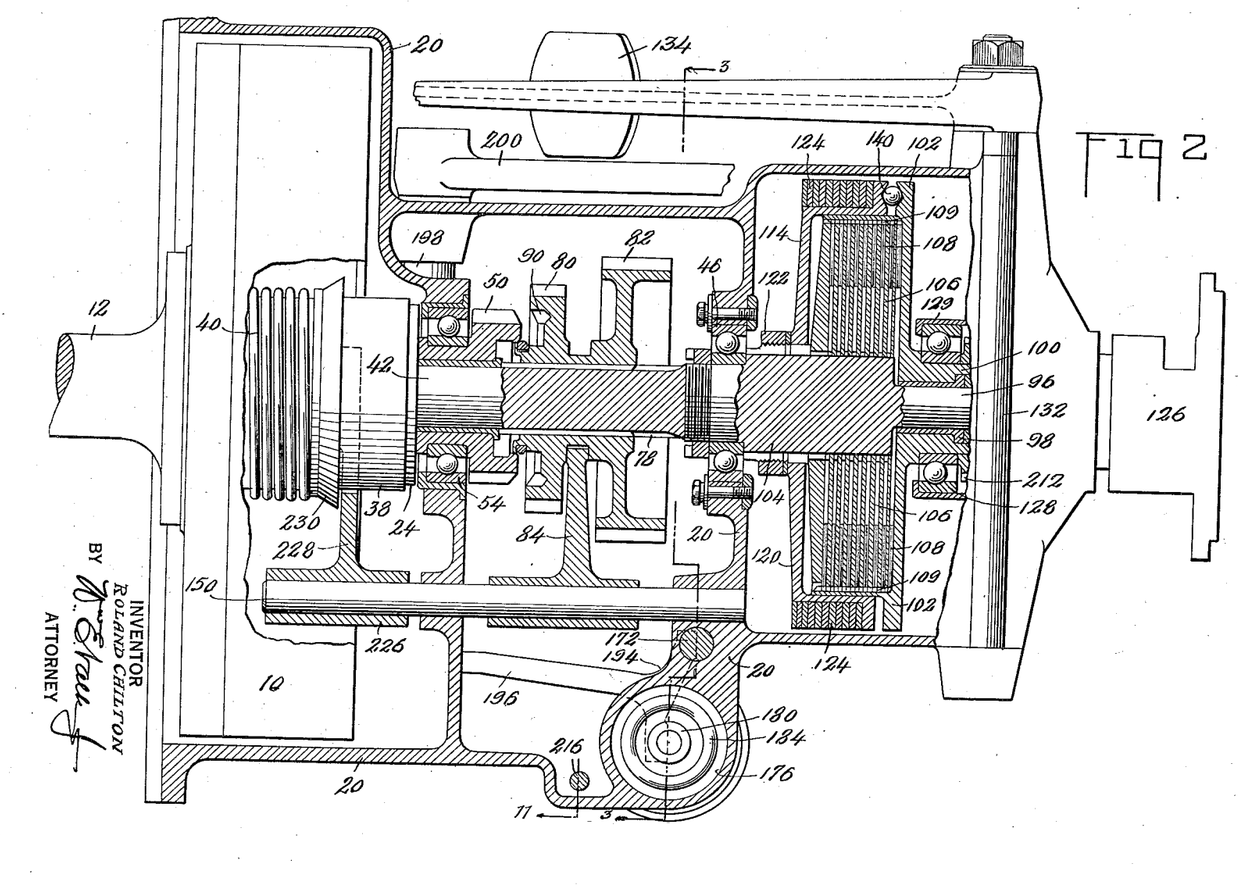
Fig. 2 is an inverted plan view in axial section on the line 2—2 of Fig. 3.
Figure 3:
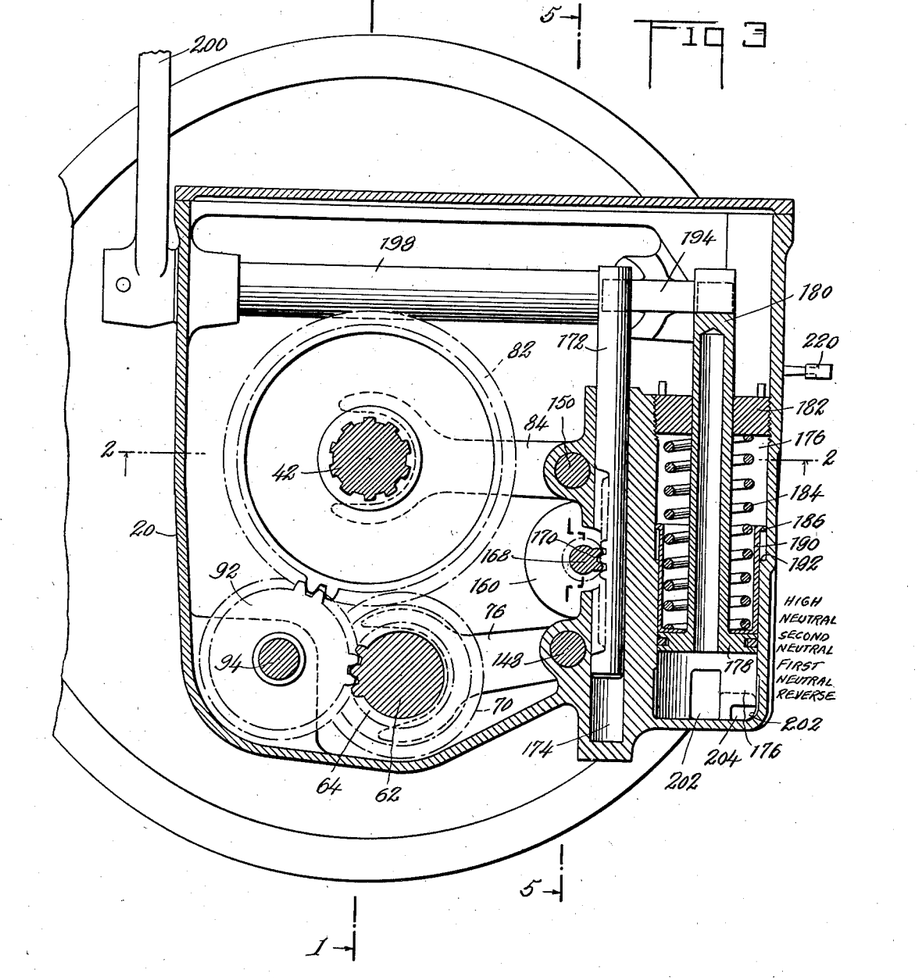
Fig. 3 is an end sectional view on the line 3—3 of Fig. 2.

The shifter forks 76, 84, are slidable on fixed rods 148, 150 (Figs. 3, 8, 2) and have integral pins 152, 154, engaged in cam grooves 156, 158, in the cam drum 160 secured for rotation with the shaft 162 mounted in the bearing 164 and bushing 166. The shaft 162 is provided with a pinion 168 meshed with the rack teeth 170 in the plunger 172 slidable in the bore 174 in the housing 20 (Fig. 3).

Figure 4:
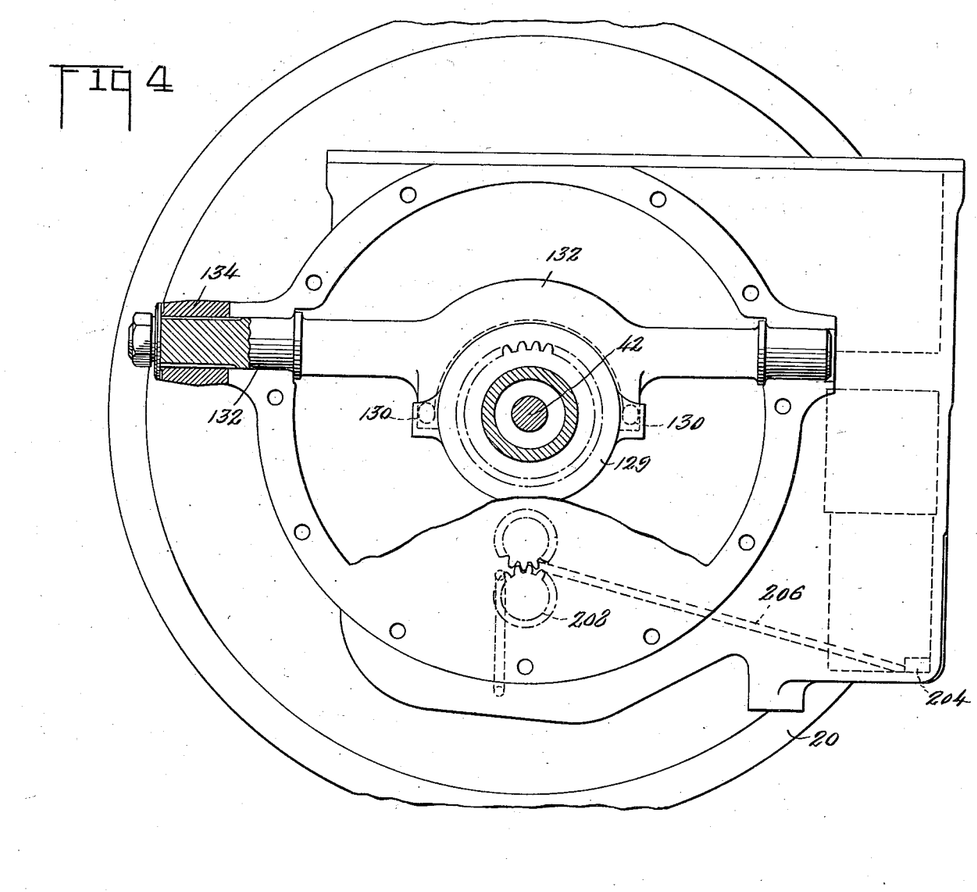
Fig. 4 is a rear end view with the rear cover removed.
Figure 11:
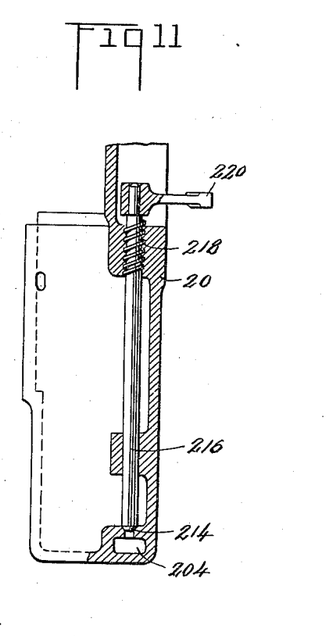
Fig. 11 is a detail sectional view through the control valve on the line 11—11 of Fig. 2.

Formed in the housing 20 is the cylinder 176 in which is fitted the piston 178 having the rod 180 slidable through the bushing 182 against the pressure of the control spring 184. The downward action of the spring is limited by the shoulder 186 of the sleeve 190 engaging the abutment 192. The upper ends of both the rack plunger 172 and of the piston plunger 180 are grooved to engage the ends of a T-piece 194, Fig. 2, formed integral with the lever 196 secured to the shaft 198 to which is secured the manual shift lever 200. It will be seen that the rack 172 and the piston 178, 180, are connected for simultaneous vertical travel by the T-piece 194 of the lever 196. The cylinder 176 has by-pass ports 202 at its lower end and an oil inlet passage 204, connected as indicated by the dotted lines at 206, (Fig. 4) to the delivery side of an oil pump 208 driven by the gears 210, 212, from the driven shaft 100. The inlet port 204 is provided with a bleed orifice 214, (Fig. 11), adjustable by the valve spindle 216, which is screw-threaded at its upper end as at 218 into the housing 20 and provided with a lever 220 connected to a driver's control (not shown).

Figure 5:
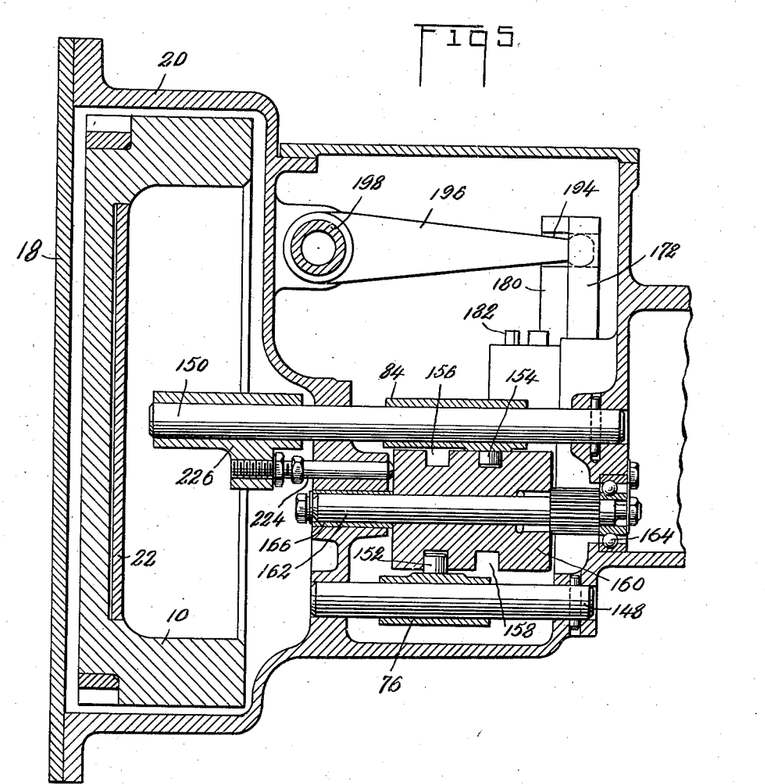
Fig. 5 is a longitudinal section on the line 5—5 of Fig. 3.

The cam drum 160 is provided at its left hand end with depressions 222 (Figs. 5, 6, 8), forming a face cam for actuating the tappet 224 adjustably fixed in the boss 226 of the clutch fork 228 which is slidable on an extension of the shifter rod 150 and which fork engages the shoulder 230 of the clutch control collar 38.

The operation of the device is as follows: Whenever the control shaft 198 is moved, either through the hand control lever 200 or by the spring and hydraulic reactions on the automatic piston 178, the rack 170, 172, is moved vertically, rotating the cam drum 160 through its pinion 168 and actuating the appropriate shifter fork, through the cam slots 156, 158, to the right or left as will be clear from the cam development view of Fig. 6. The clutch actuating depressions 222 in the end of this cam are so related to the cam slot profiles that the clutch tappet 224 falls into one of these depressions whenever a gear is fully engaged thus releasing the clutch control sleeve 38 to the action of the clutch spring 40 which engages the coil clutch 30 through the tapered actuated key 34 as previously described. Initial rotation of the cam drum from any in-gear position moves the tappet 224 and therefore the clutch fork 228 to the left of Figs. 2 and 5 releasing the coil clutch, which release is complete before the cam slots start to move the associated shifter fork pin as will be clear by noticing the initial parallel conformation of these cam slots on either side of the various in-gear positions designated on Fig. 6. Continued motion of the cam drum first completely retracts the gear being disengaged to neutral position and then holds it there while the succeeding gear is engaged, whereupon the clutch fork tappet 224 falls into the succeeding depression 222, re-engaging the coil clutch, as previously described.

Coil clutches of this character tend towards sudden engagement which produces high acceleration of the driving or inner plates 106 of the inertia control clutch. The floating inertia member 120, however, will lag behind any such instantaneous acceleration of the clutch, thus exerting an opposing pressure against the clutch spring 116 through the inclined tracks 138 and balls 140 previously described. Thus, by a suitable balance between the angularity of these tracks and the adjustment of the clutch spring 116, and by suitable selection of the inertia weights 124 the clutch is made to slip whenever a pre-determined maximum acceleration of the driven shaft 100 is reached. This factor is preferably pre-set at a high rate of acceleration which may, at any time, be reduced by the driver by applying appropriate pressure to the clutch pedal 134 which also opposes the clutch spring 116 through the clutch control shaft 132 and the clutch thrust bearing 128, causing the clutch to slip at a lower torque.

It should be emphasized that this does not involve any actual depression of the pedal 134 or any timed or coordinated pressure thereon; the effect of the driver resting his foot on this pedal being that the optimum accelerations transmitted through the acceleration limiting clutch are reduced in proportion to the pressure applied to the pedal continuously throughout manual or automatic gear shifting.

It will further be evident that the cam mechanism provides a straight-through type of shift lever action to go through the successive gears in place of the more common selective or gate type of shift involving lateral motion of the shift lever.

While the cam drum 160 and the hydraulic actuating piston 178 have been drawn in that neutral position which lies between first and second gears, the normal position with the vehicle stopped will be in neutral between first and reverse. The shift at starting into first or reverse is made manually through the lever 200, the initial movement disengaging the coil clutch 30 as previously described, and the further movement engaging first or reverse gears accordingly, as the lever is shifted forward or backwards. In this neutral position between first and reverse the by-pass ports 202 in the cylinder 176 bridge the piston 178, and the pressure from the spring 184 is taken by the collar 186 of the sleeve 190 whereby the piston is freed from both spring and hydraulic pressure. It will also be noted that the correlation of the clutching and shifting functions is automatically derived from movement of the lever 200 through the cam 160 and the tappet 224, as previously described, without clutch pedal manipulation by the driver.

However, as the vehicle moves forwardly in first gear the oil pressure pump 208 builds up pressure under the piston 178 in proportion to the speed of the driven shaft 108 (which is proportional to the speed of the vehicle) which proportion, however, may be varied by the setting of the bleed valve 216. Upward motion of the piston 178 is resisted by the spring 184, and also by the clutch actuating tappet 224 which must be lifted out of its depressions 222 in the cam 160 against the pressure of the clutch spring 40 before the piston can rotate the cam. It will be noted that these depressions are of arcuate profile, giving a decreasing resistance to the rotation of the cam as the tappet 224 is lifted towards disengagement of the coil clutch. Thus, when the hydraulic pressure on the piston 178 builds up from increasing vehicle speed sufficiently to initiate rotation of the cam, this rotation will continue until the tappet 224 falls into the succeeding depression 222, whereupon the shift into the succeeding gear ratio has been completed and the coil clutch reengaged. At the same time the movement of the piston 178 has built up increasing pressure on the spring 184 requiring increased vehicle speed to build up the increased hydraulic pressure required to effect a shift into the next successive higher gear.

If, however, while in any specific gear ratio, the driver desires to accelerate the next shift he has only to open the bleed valve 216 to drop the pressure beneath the piston 178 whereupon the spring 184 will move the mechanism to the next lower gear. Conversely, reducing of the opening of the bleed valve 216 will initiate an automatic shift into higher gear by increasing the hydraulic pressure.

It will now be seen that after the first gear has been manually engaged the subsequent shifts are automatic and occur at vehicle speeds depending upon the setting of the bleed valve.

It should further be seen that whenever the car in traveling in one of the higher gears is slowed down, as by a gradient, to the point where the hydraulic pressure falls sufficiently below that of the spring 184 to turn the cam 160 against the restraining pressure of the clutch actuating tappet 224, the mechanism will automatically change down into the next lower ratio.

Because of the practically instantaneous action characteristic of the coil type of clutch, and because of the extremely small inertia of its driven member, it will be practicable to engage the gears or gear clutches without waiting for speed synchronization between them, and further, because of the absence of drag which also characterizes coil clutches, extremely fast shifting action may be realized. This will make it possible for the driver, after his initial start into first gear, to keep the engine accelerator continuously depressed whenever he desires maximum acceleration. The clutch disengaging period will be shorter than normal and therefore the acceleration of the engine under open throttle during shifts will be reduced. Even without this feature, the surge which usually accompanies clutch engagement with the engine speeded up will be suppressed by the automatic slippage of the acceleration limiting clutch, all without manipulation or skill of the driver. These factors will enhance the acceleration performance of the car through the successive gears, which is a maximum when each shift is delayed until the engine has got to its speed of maximum horse power which can be arranged thru the appropriate setting of the bleed valve. When less-than-optimum acceleration is desired, i. e., when it is desired to go through the gears without reaching high engine speeds, the desired result is effected by having the bleed valve in a more closed position.

Figure 10:
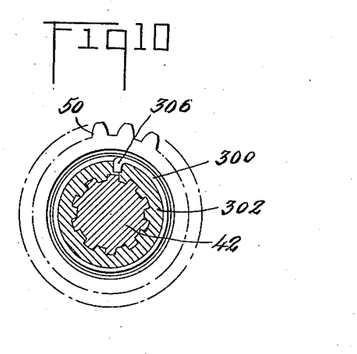
Fig. 10 is a detail sectional view through a synchronizing device on the line 10—10 of Fig. 1.

Although it is a feature of this invention that the driven member 32 of the coil clutch adds very little to the inertia of the gear system, so that rapid gear shifting will be practicable without waiting for synchronization of the gears, it will be obvious that any known type of synchronizing device may be incorporated if desired. For reasons of simplicity and compactness, however, the special form of spring ring synchronizing device shown in end view in Fig. 10 is preferred, three of these devices appearing in section in Fig. 1. For instance, it will be noted that before the internal teeth 90 of the second speed main shaft gear 80 can engage the end of the stem gear teeth 50 by leftward travel of the gear 80, the spring ring 300 which is engaged in a suitable groove in an extension 302 of the gear 80 will be forced to pass through the reduced diameter clutching surface 304 of the gear 50 which has a tapered entrance and exit as shown. The ring 300 is inturned at one end as seen at 306, Fig. 10, to engage a transverse slot cut through the projection 302 whereby the ring is restrained to rotate with its associated gear. The free diameter of the ring is such that it generates a substantial frictional drive between the gears to be engaged as the ring is contracted in passing through the reduced diameter clutching surface 304.

The layshaft, as previously described, comprises the rigidly connected gears 64 and 66 with which the independently rotatable gears 74 and 70 are respectively to be synchronized, and since more room is afforded at the large gear 86, both synchronizing devices are incorporated at this end of the shaft, the inner spring ring is held to rotation with the sleeve 72 of the gear 70, and the outer ring is held to rotation with the annular extension 308 of the gear 66 as just described in the case of the direct drive synchronizing spring 300.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. The combination with a drive shaft and a driven shaft, of a transmission having gears shiftable into high and low ratios connecting said shafts, a cam means movable to shift said gears, fluid pressure means operatively connected to said cam to urge said cam towards high ratio position responsively to the speed of one of said shafts, spring means operatively connected with the cam to urge said cam to low ratio position, and shifter forks operatively connecting said cam and gears.

2. The combination with a transmission affording various gear ratios between driving and driven shafts, of a fluid pressure pump driven from one of said shafts, a piston movable by pressure from said pump, a spring means operatively connected to said piston to urge the piston to opposite movement, and gear shifting means operated by said piston movements into high and low gear ratios respectively, said gear shifting means including a cam and means connecting the cam to the piston for rotation thereby.

3. In a transmission including a drive shaft and a driven shaft and gears therebetween shiftable to high gear, low gear and neutral positions, in combination, a gear shifting cam operatively connected to said gears, means to yieldably restrain said cam in in-gear position, means adapted to develop fluid pressure proportional to the speed of one of said shafts, means to vary said proportion at will, and means to operate the cam from such pressure.

4. In a transmission having a drive shaft and a driven shaft, in combination, gears between said shafts shiftable to high and low ratios, shifter forks engaging said gears, cam means connected with said forks and rotatable to shift said forks one at a time, a cam operating piston, a pump driven from one of said shafts and pressure connected with one side only of said piston, a spring connected with and effective on the other side of said piston, and a pressure control valve in said pressure connection movable at will during the operation of the transmission to comprise a manually controlled hydraulic gear shift.

5. In a transmission having a drive shaft and a driven shaft, the combination with shiftable transmission gears between said shafts, of a rotatable cam, a pinion, a rack, a piston and an operator's gear shift lever, all mechanically connected for simultaneous movement; gear shifter forks connected with and movable one at a time by said cam, a pump driven by one of said shafts and in continuous hydraulic communication with one side of said piston, and a spring connected with said piston to urge said piston to move in opposition to said hydraulic means.

ROLAND CHILTON.